Oct. 23, 1973  C. BORDENCA  3,767,785
INSECT REPELLENT ARTICLES
Filed July 3, 1969

CARL BORDENCA
INVENTOR.
BY ATTORNEY 3,767,785
INSECT REPELLENT ARTICLES
Carl Bordenca, Ponte Vedra Beach, and John M. Derfer, Jacksonville, Fla., assignors to SCM Corporation, Cleveland, Ohio
Continuation-in-part of application Ser. No. 753,031, July 26, 1968, now Patent No. 3,644,645, which is a division of application Ser. No. 607,876, Jan. 9, 1967, now Patent No. 3,446,843, which in turn is a continuation-in-part of abandoned application Ser. No. 479,009, Aug. 11, 1965. This application July 3, 1969, Ser. No. 838,897
Int. Cl. A61k 9/00
U.S. Cl. 424—29                9 Claims

ABSTRACT OF THE DISCLOSURE

A novel article comprising a web containing a quantity, sufficient to repel insects, of a compound of the formula:

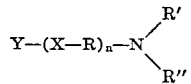

where

Y is a monovalent organic radical,
X is sulfur or oxygen,
R is lower alkylene,
R' and R" are like or dissimilar lower alkyl, and
$n$ is an integer from 1 to 3, is described. Packaging containers comprising and/or fabricated from these articles are also described.

The invention is advantageous in that the articles exhibit repellent properties toward a wide spectrum of insects. The webs when converted into packages or components thereof protect the contents of packages from invasion or infestation by insect pests.

---

This application is a continuation-in-part of copending U.S. patent application Ser. No. 753,031, filed July 26, 1968 (now U.S. 3,644,645) which in turn was a division of Ser. No. 607,876, filed Jan. 9, 1967 (now U.S. 3,446,-843) which in turn was a continuation-in-part of Ser. No. 479,009, filed Aug. 11, 1965 (now abandoned), said division, said continuation-in-part and said parent application being assigned to the same assignee as the present application. Each of the above patent applications is incorporated herein by reference.

The invention relates to insect repellency and more particularly to webs containing a class of insect repellent compounds. The invention is advantageous in that webs containing one or more of the insect repellent compounds can be fabricated into clothing, containers and packages or employed as components thereof, significantly lessening the possibility of insect invasion of the interior of the containers with attendant contamination of the contents.

The articles of this invention exhibit repellent properties toward a wide spectrum of insects such as, for example, moths, mosquitoes, ants, beetles, cockroaches, lice, houseflies, stable flies, and the like.

The present invention provides an article comprising a web containing an insect repellent quantity of a compound of the formula:

(I)

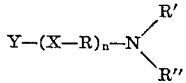

where

Y is a monovalent organic radical,
X is sulfur or oxygen,
R is lower alkylene,
R' and R" are like or dissimilar lower alkyl, and
$n$ is an integer from 1 to 3.

Compounds falling within the scope of the above formula are mostly water insoluble and are generally soluble in the conventional organic solvents employed in insectiphobic formulations. The compounds are usually liquid, have the general properties of oils and boil between 100° and 170° C., the boiling points being measured at a pressure of 1 mm. of mercury.

The webs comprising this invention, when fabricated into packages, or used as components of packaging containers such as boxes, cartons, drums, bags, and the like, will significantly lessen or prevent invasion of the containers and attendant contamination of contents of the packages by common insect pests.

The webs may be fabricated into containers having rigid construction (e.g. fibre drums, corrugated boxes, etc.); containers having flexible construction (e.g. paper or plastic bags); and rigid and flexible interior linings for containers.

The term "web" as used herein is intended to refer to a lamina or sheet and includes lamina and sheets such as matted fibers (e.g. paper and cardboard), woven fabrics, resinous polymer sheets, and materials such as animal hides and leather. The webs can comprise a wide variety of materials, for example, they can be cellulosic (e.g., paper or woven cotton fabric), proteinaceous (e.g., animal hides, certain synthetic polymers, wood or silk), or synthetic polymers such as cellulose acetate, polyethylene, polypropylene, or polystyrene, etc., which has been molded or extruded in the form of a sheet.

The webs contain a quantity sufficient to repel insects of at least one compound falling within the class of the formula hereinbefore defined and the compound can be on the surface or incorporated within the body of the web.

Referring to the accompanying drawings, FIGS. 1 through 8 represent cross-sections of various kinds of webs and the letter A in each drawing designates a compound falling within the scope of Formula I, the letter B designates the body of the web.

Figure 1:
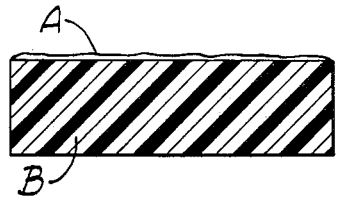
FIG. 1 represents a cross-section of a web consisting of a resinous polymer in which the web is coated with at least one compound, falling with the scope of Formula I.
Figure 2:
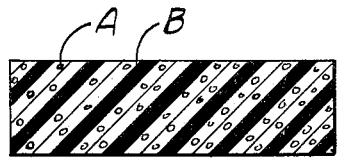
FIG. 2 represents a resinous polymer web wherein at least one compound falling within the scope of Formula I is incorporated within the body of the web.
Figure 3:
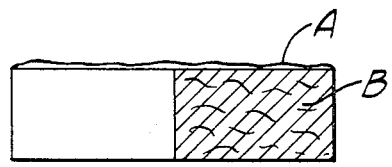
FIG. 3 shows a cross-section of a leather web coated with a compound falling within the scope of the formula hereinbefore described.
Figure 4:
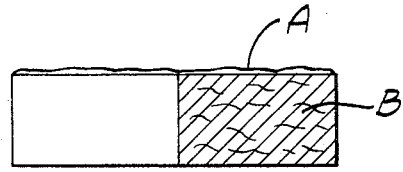
FIG. 4 represents a cross-section of a web consisting of cellulosic fibers in which the web is coated with a compound falling within the scope of Formula I.
Figure 5:
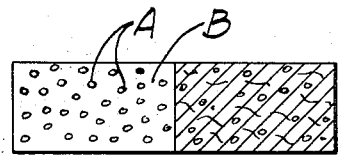
FIG. 5 shows a cross-section of a cellulosic fiber web wherein a compound falling within the scope of Formula I is incorporated within the body of the web.
Figure 6:
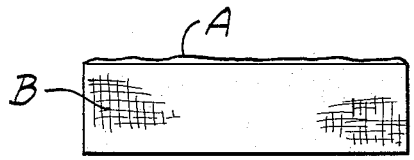

A cross-section of a cloth fiber web coated with a compound falling within the scope of Formula I is represented by FIG. 6.

Figure 7:
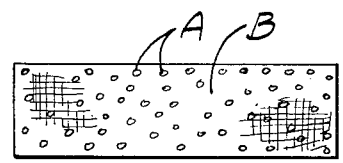

FIG. 7 shows a cross-section of a cloth fiber web wherein an insect repellent falling within the scope of Formula I is incorporated within the body of the web.

Figure 8:
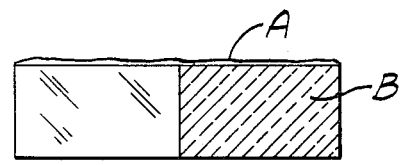

FIG. 8 represents a cross-section of a glass fiber web coated with an insect repellent falling within the scope of the formula hereinbefore described.

Figure 9:
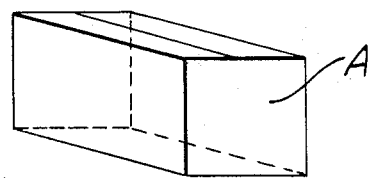
Figure 10:
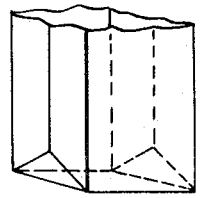

FIG. 9, illustrating a cardboard box and FIG. 10 a paper or plastic bag or sack represent but two examples of the variety of uses of the insect repellent webs.

Webs comprising one aspect of this invention may be formed by incorporating one or more of the insect repellent compounds falling within the scope of Formula I in or on the surfaces of the web. One or more of the compounds may be incorporated in or on any of the various kinds of webs in a variety of ways. The method of incorporation will depend, in part, upon the particular type of web which it is desired to employ. For example, the compound can be incorporated in or on the web by immersing the web in a solution containing the compound. Such compound may be incorporated in or on the web by applying a solution of the compound and a coating to the web. The amount of the solution so applied can be varied by the use of scraper blades disposed against face of the web as it leaves the solution container. Alternatively, the web may pass between two metering rolls (squeeze rolls) to improve solution penetration and to remove undesirable excess. In processing non-woven webs, such as cardboard or paper, the incorporation process may require the use of a support screen through the solution containers followed by travel around a suction roll. Other variants of the incorporation process may involve a prolonged period of travel through the solution as well as passage between multiple squeeze rolls to ensure thorough penetration.

Many arrangements for surface incorporation by a wet process are possible. The amount of compound can be controlled by a "doctor" knife, extending the full width of the web. A reverse roll may also be used. In this process the solution is metered between the top rolls prior to application to the web as it passes around the bottom roll.

Included in a dry incorporation embodiment are 100% solid resin compositions containing the compound as well as heated thermoplastic masses that may be applied by hot calendering or by extrusion techniques. Plastisol compositions containing the compound may be applied by the coating knife process described above or by the reverse-roll technique.

Use of powdered resin directly on a web containing the repellent compounds can also be employed. Application of the resin composition may be by the "flour-sifter" technique involving a rotating brush roll operating against a screen surface. Alternate methods may employ a cloud chamber through which the web passes while supported by a suction roll, or the use of the bronzing fountain design which employs a plush-covered roll operating in the bottom of a hopper. From the powder application station the web may pass under an infrared heating zone to fuse the resin composition without disturbance from air convection currents.

The hot calender coating process accepts a heated plastic mass containing the repellent compound and forms it into a sheet or film which may be used per se or laminated against another web.

The extrusion incorporation process can employ a sheet formed by extrusion through a slot die which can then be used per se or laminated with another web. The materials that may be applied in this process includes most thermoplastic resins and plastisol formulation containing one or more insect repellent compounds.

The cast web technique may also be used with a suitable flexible casting-support web replacing the stainless steel belt. Such webs include paper with silicone, urea-formaldehyde, or carboxymethylcellulose surface lamina and glass or other fiber textiles carrying release coatings such as tetrafluoroethylene.

Insect repellent webs, can be used per se as insect repellent articles. Alternatively and preferably the webs can be fabricated into packages or used as components of packaging units such as drums, textile bags, multi-wall paper bags, plastic bags, corrugated boxes,, cartons and the like.

Fiber drums may be fabricated to include insect repellent webs. The fiber drums may form a container having rigid or flexible walls of the webs, or such webs may be inserted into the drum as a lining. Such drums usually have a capacity ranging from ¾ to 75 gallons, have great strength and are relatively light in tare weight. Dry bulk powders, semi-solids and liquids may be packaged in fiber drums.

Textile bags are made principally from burlap, cotton and a simulated burlap made of woven polypropylene. Textile bags are popularly used as containers for flour, feed, seed, grain and other mill and farm products which are susceptible to insect infestation.

Multi-wall paper bags are used extensively for packaging of insect infestable commodities such as flour and sugar, while plastic bags are widely used as containers for food products of all types.

Boxes are usually rectangular containers made of corrugated or solid fiberboard. Cartons are manufactured from thin bendable paperboard. Both boxes and carton are used to package a wide variety of articles, in which insect infestation and or contamination is undesirable.

Containers comprising or fabricated from the webs tend to maintain an insect-free environment in cases where a variety of food and other products susceptible to insect infestation are stored, transported or dispensed.

Insect repellent webs can also consist essentially of cellulosic fibers containing one or more of the insect repellent compounds. One of the more widely used cellulosic fiber webs is paper. Paper is made in various types and grades and is usually distinguished generally as paper and paperboard, the latter being heavier, thicker and less flexible than conventional paper. The major grades of paper are coarse wrapping and bag papers, coated printing paper, uncoated bookpaper, newsprint, uncoated groundwood paper, writing and other fine paper, and tissue. The principal grades of paper board are containerboard, folding box board and food board.

The insect repellent webs of this invention may comprise essentially any one of the above-described types or grades of cellulosic webs. The web may be manufactured from any kind of celluloisc pulp and the insect repellent compound falling within the scope of Formula I can be incorporated in or on the web before or after completion of the manufacturing process by which paper is produced. If the compound is to be incorporated in or on the web prior to the completion of the manufacturing process, it may be incorporated during the sizing process. Unsized paper freely absorbs liquids. If the insect repellent compound is a liquid, it may be added directly in the form of a dilute solution to the paper during the sizing process. Where the insect repellent compound is mixed with a solid carrier, it may be absorbed by the paper during the sizing process. The compound may be incorporated into a dye and added to the paper prior to the sheet-forming process. Both water soluble dyes and water dispersible pigments may be added to paper before sheet forming.

The compound may be incorporated in the dye or pigment and thereby incorporated on or in the paper.

Such compound may be incorporated in or on the paper during any of the various treatments which paper may undergo after manufacture. Such treatments include the embossing, impregnating, saturating, laminating, and paper coating processes. Pigments for paper are compositions of pigments and adhesives. The insect repellent compound may be applied to the pigment and/or adhesive and incorporated on or in the paper when the pigment and/or adhesive is applied. For economic reasons it has generally been found preferable to incorporate the insect repellent compound falling within the scope of Formula I in or on the paper.

The webs may consist essentially of cellulosic fibers obtained from cotton. Cotton fibers are among the world's most important textile fibers, both in the domestic field and in industry and commerce. These fibers are manufactured into woven and non-woven fabrics which have a variety of uses. A great percentage of the fibers used in clothing and cloth application of all kinds are cotton fibers. Such cotton fibers are also used in different types of packaging materials and coverings.

The webs may consist essentially of any of the various types, grades and combinations of cotton fibers. An insect repellent compound falling within the scope of Formula I may be incorporated in or on the cotton fibers at any time after the ginning process (i.e. separation of the cotton lint fibers from the cotton seed). Because of the various processes used to produce cotton fiber with a variety of properties it has been found generally desirable to incorporate the compound in or on the cotton fiber during or after the dyeing and finishing processes.

The insect repellent compound can be applied in the form of a solution directly to and absorbed by the cotton fibers. If the insect repellent compound is employed with a solid carrier it may be melted or dusted on the cotton fibers. The insect repellent compound may also be incorporated within a dye and applied to the cotton fiber at the time of the dyeing process.

Clothing made from insect repellent fiber webs when worn is useful in promoting comfort by repelling biting insects such as mosquitos, flies and the like.

Silk and wool comprise a large amount of the proteinaceous materials that may be used as woven fabric webs. Silk and wool fibers may be used as fabric in a woven or unwoven state. Both fibers are used as fabrics for clothing, various specialty uses and the like.

An insect repellent compound falling within the scope of Formula I may be applied to silk fibers at any time after removal of fibers from the cocoon. The compound may be applied to the silk fibers as it is applied to cellulosic fibers and/or webs.

An insect repellent compound falling within the scope of Formula I may be applied to wool fibers at any time after the wool has been removed from the animal and has been set. The compound may be applied to the wool fibers in the same or similar manner as it is applied to cellulosic fibers and/or webs.

The insect repellent webs of this invention may also consist essentially of proteinaceous materials such as animal hides and skins. Most of these materials produced are used in shoes, the remainder being used in belting, harness saddle, animal collars, riding tack, upholstery luggage, clothing, gloves, chamois, mechanical and athletic goods and the like.

An insect repellent compound falling within the scope of Formula I may be applied to this type of web before or after tanning. If the compound is applied to the proteinaceous material before tanning, it may be applied in any of the curing and pre-tanning processes. The compound may be incorporated in or on the proteinaceous material in the same manner it is coated or incorporated on cellulosic webs.

The compound may be applied to the proteinaceous material during or after the tanning process, whether the tanning process used be vegetable tanning, synthetic tanning, chromic tanning or the like. The compound may be incorporated in or on the proteinaceous material as it is coated or incorporated on cellulosic webs.

This invention is further advantageous in that it is particularly desirous to maintain an insect-free environment where proteinaceous materials are used as articles of clothing, shoes, specialty animal collars and clothing, athletic goods, carpets and the like.

The webs of this invention may consist essentially of synthetic as well as fibers from natural sources. Synthetic textile fibers are generally cellulose derivatives, polyacrylonitriles, polyesters, polyvinyl alcohols, polyvinyl chlorides, polyvinylidine chlorides, polytetra-fluoroethylenes, polyurethanes, glass fibers and the like. These fibers have their main use in the apparel, fabric coverings, and industrial fabrics and cordage. In addition glass fibers have applications such as household curtains.

The insect repellent webs of this invention can be made from any of the various types, grades and combinations of synthetic and natural fibers. An insect repellent compound falling within the scope of Formula I may be incorporated in or on the synthetic or natural textile fibers as it is incorporated in or on cellulosic fibers or webs.

The insect repellent webs of this invention can also consist of polymers and co-polymers of olefins and the like. The most widely used of the polymers and co-polymers include polyethylenes, ethylene-vinyl acetate, polypropylene, polystyrene and the like. Polymers and co-polymers have their main use as transparent packaging for fresh meats, vegetables, and the like, packages for animal foodstuffs, fertilizers and the like, and bags used for similar purposes.

The webs of this invention can also consist of any of the various types, grades and combinations of polymers and co-polymers. An insect repellent compound falling within the scope of Formula I may be incorporated in or on the polymers and co-polymers prior to extrusion by mixing the compound with the plastic pellets and extruding the mixture. The compound may be incorporated in or on the fibers as it is incorporated in or on cellulosic fibers and/or webs.

The amount of insect repellent compounds falling within the scope of Formula I which can be incorporated in or on the insect repellent webs can vary from between about 25 and about 175 milligrams per square foot of web surface. The particular amount of insect repellent compound incorporated will depend on whether the compound is incorporated in or on the web. If the web contains less than about 25 milligrams per square foot of insect repellent material, repellency against some insect species may sometimes be adversely affected. Although more than about 175 milligrams of insect repellent compound per square foot of web may be employed, there is no advantage with respect to utility and excess amounts may be economically disadvantageous. Generally, where the insect repellent material is incorporated within the body of the web, the web can contain from about 75 to about 150 milligrams of insect repellent material per square foot.

Where the insect repellent material is incorporated on one surface of the web, from about 50 to about 125 milligrams of insect repellent material per square foot of web has been found to be advantageous.

The insect repellent compounds falling within the scope of Formula I which are incorporated in or on the hereinbefore described webs are relatively non-toxic to higher animals and man and have been fed to warm blooded animals in concentrations and amounts above those which are insectiphobically effective without adverse effects. These insect repellent webs have been applied with insectiphobically active amounts of said compounds to the skin of human beings and laboratory animals. without significant harmful effects. Standard evaluation tests have shown that these compounds are not hazardous skin irritants.

As previously noted the insect repellent webs of this invention contain a quantity sufficient to repel insects, of an insect repellent compound of the formula:

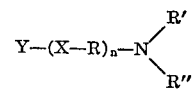

where

Y is a monovalent organic radical,
X is sulfur or oxygen,
R is lower alkylene,
R' and R" are like or dissimilar lower alkyl, and
$n$ is an integer from 1 to 3.

In the above formula Y can represent a terpenoid or non-terpenoid group. When Y is terpenoid, Y can represent terpenyl or sesquiterpenyl, and when Y represents terpenyl, Y can be acyclic, monocyclic or bicyclic terpenyl. When Y represents sesquiterpenyl, Y can be acyclic, monocyclic, bicyclic or tricyclic sesquiterpenyl.

Acyclic terpenyl groups which can be represented by Y include for example, citronellyl, bupleuryl, geranyl, neryl, lavanduyl, linalyl and mercenyl. Monocyclic terpenyls which can be represented by Y include menthyl, tetrahydrocarvyl, alpha-terpenyl, beta-terpenyl and gamma-terpenyl, terpenenyls, dihydrocarvyl, piperityl, isopulegyl, carvyl, etc. Bicyclic terpenyl groups which Y can represent include nopyl, sabinyl, thujyl, pinocamphanyl, camphanyl, myrtenyl, verbenyl, caranyl, pinocarvyl, the santenyls, bornyl, isobornyl, fenchyl, isofenchyl and the like.

When Y represents sesquitepenyl, Y can be acyclic (e.g. farnesyl and nerolidyl); monocyclic (e.g. bisabolyl and zingiberyl); bicyclic (e.g. cadinyl, carylphyllenyl and selinyl); and tricyclic (e.g. cedryl and the santenyls).

Compounds where Y is non-terpenoid include, for example, substituted and insubstituted saturated, and substituted and unsubstituted unsaturated, aliphatic and cyloaliphatic groups; substituted and unsubstituted aryl, alkaryl and aralkyl groups.

Saturated acyclic aliphatic groups or radicals which can be represented by Y include methyl, ethyl, n-propyl, iso-propyl, n-butyl, sec-butyl, t-butyl, pentyl, hexyl, heptyl, octyl, nonyl, decyl, undecyl, dodecyl groups or radicals and halo-, nitro-, and amino-lower alkyl-substituted derivatives of these acyclic aliphatic groups. Saturated cycloaliphatic groups or radicals which Y can represent include cyclo-pentyl, cyclo-hexyl and cyclo-octyl groups or radicals and the halo-, nitro-, amino- and lower alkyl substituted derivatives of these cyclo-aliphatic groups.

Examples of unsaturated acyclic aliphatic groups or radicals which can be represented by Y include allyl, crotyl, sorbyl, linolyl di-isobutenyl carbinyl, etc., groups or radicals and halo-, nitro-, amino- and lower alkyl-substituted derivatives of these unsaturated groups or radicals.

Examples of unsaturated cyclo-aliphatic groups or radicals which Y can represent include cyclo-pentenyl, cyclopentadienyl, cyclo-hexenyl, cyclo-octenyl, cyclo-dodecenyl, vinyl, etc., and halo-, nitro-, amino- and lower alkyl-substituted derivatives of these unsaturated cyclo-aliphatic compounds.

Examples of aryl groups which can be represented by Y include phenyl, naphthyl, phenanthryl, anthracyl, dihydroanthracyl and halo-, nitro- and amino-substituted derivatives of these aryl groups; examples of alkaryl groups which can be represented by Y include tolyl, xlyl, cumyl, vinyl-phenyl, methyl-naphthyl, ethyl-naphthyl, etc., and halo-, nitro- and amino-substituted derivatives of these alkaryl groups. Examples of aralkyl groups which can be represented by Y include benzyl, phenyl-ethyl, phenyl-hexyl, styryl, cinnamyl, etc., and halo-, nitro- and amino-substituted derivatives of these aralkyl groups.

In the above formula, R represents a lower alkylene, preferably ethylene, propylene, butylene, pentylene or hexylene and preferably methylene or ethylene for economic reasons. R' and R" are like or dissimilar lower alkyl and are preferably like lower alkyl because of the difficulty sometimes associated with preparation of compounds in which R' and R" are unlike. R' and R" are preferably like lower alkyl and are more preferably methyl, ethyl, propyl, or butyl because of the ready availability of these alkyl substituents.

Examples of specific compounds falling within the scope of the insect repellent compound of Formula I of this invention where Y is terpenoid include, for example:

2-dimethylaminoethyl geranyl thioether
2-diethylaminoethyl geranyl thioether
2-diethylaminoethyl carvyl thioether
2-dimethylaminoethyl carvyl thioether
2-diethylaminoethyl 3-pinanyl thioether
2-dimethylaminoethyl 3-pinanyl thioether
2-dimethylaminoethyl 1-(8-mercapto menthanyl) thioether
2-diethylaminoethyl 1-(8-mercapto menthanyl) thioether
2-dimethylaminoethyl 8-(1-mercapto menthanyl) thioether
2-diethylaminoethyl 8-(1-mercapto menthanyl) thioether
2-dimethylaminoethyl terpinyl thioether
2-diethylaminoethyl terpinyl thioether
2-dimethylaminoethyl isobornyl thioether
2-diethylaminoethyl isobornyl thioether
2-dimethylaminoethyl linalyl thioether
2-diethylaminoethyl linalyl thioether
2-dimethylaminoethyl verbenyl thioether
2-diethylaminoethyl verbenyl thioether
2-dimethylaminoethyl pinocarvyl thioether
2-diethylaminoethyl pinocarvyl thioether
2-dimethylaminoethyl farnesyl thioether
2-diethylaminoethyl farnesyl thioether
2-dimethylaminoethyl thymyl thioether
2-diethylaminoethyl thymyl thioether
2-dimethylaminoethyl nopyl thioether
2-diethylaminoethyl nopyl thioether
2-dimethylaminoethyl 1-(2-caren-4-yl) thioether
2-diethylaminoethyl 1-(2-caren-4-yl) thioether
2-dimethylaminoethyl 2-caren-4-yl methyl thioether
2-diethylaminoethyl 2-caren-4-yl methyl thioether
2-dimethylaminoethoxyethyl terpinyl ether
2-diethylaminoethoxyethyl terpinyl ether
2-dimethylaminoethoxyethyl geranyl ether
2-diethylaminoethoxyethyl geranyl ether
2-dimethylaminoethoxyethyl isobornyl ether
2-diethylaminoethoxyethyl isobornyl ether
2-dimethylaminoethoxyethyl 1-menthanyl ether
2-diethylaminoethoxyethyl 1-menthanyl ether
1-(2-dimethylaminoethoxy)-propyl isobornyl ether
1-(2-diethylaminoethoxy)-propyl isobornyl ether
2-(2-dimethylaminoethoxy)-propyl isobornyl ether
2-(2-diethylaminoethoxy)-propyl isobornyl ether
2-(2-dimethylaminoethoxy)-ethoxyethyl isobornyl ether
2-(2-diethylaminoethoxy)-ethoxyethyl isobornyl ether
2-dimethylaminoethoxyethyl carvyl ether
2-diethylaminoethoxyethyl carvyl ether
2-dimethylaminoethoxyethyl 3-pinanyl ether
2-diethylaminoethoxyethyl 3-pinanyl ether
2-dimethylaminoethoxyethyl linalyl ether
2-diethylaminoethoxyethyl linalyl ether
2-dimethylaminoethylthioethyl terpinyl ether
2-diethylaminoethylthioethyl terpinyl ether
2-dimethylaminoethylthioethyl geranyl ether
2-diethylaminoethylthioethyl geranyl ether
2-dimethylaminoethylthioethyl isobornyl ether
2-diethylaminoethylthioethyl isobornyl ether
2-dimethylaminoethylthioethyl 1-menthanyl ether
2-diethylaminoethylthioethyl 1-menthanyl ether
1-(2-dimethylaminoethylthio)-propyl isobornyl ether
1-(2-diethylaminoethylthio)-propyl isobornyl ether
2-(2-dimethylaminoethylthio)-ethoxyethyl isobornyl ether
2-(2-diethylaminoethylthio)-ethoxyethyl isobornyl ether
2-dimethylaminoethylthioethyl carvyl ether
2-diethylaminoethylthioethyl carvyl ether
2-dimethylaminoethylthioethyl 3-pinanyl ether
2-diethylaminoethylthioethyl 3-pinanyl ether
2-dimethylaminoethylthioethyl linalyl ether
2-diethylaminoethylthioethyl linalyl ether
2-dimethylaminoethoxyethyl terpinyl thioether
2-diethylaminoethoxyethyl terpinyl thioether
2-dimethylaminoethoxyethyl geranyl thioether
2-diethylaminoethoxyethyl geranyl thioether
2-dimethylaminoethoxyethyl isobornyl thioether
2-diethylaminoethoxyethyl isobornyl thioether
2-dimethylaminoethoxyethyl 1-menthanyl thioether
2-diethylaminoethoxyethyl 1-menthanyl thioether
1-(2-dimethylaminoethoxy)-propyl isobornyl thioether
1-(2-diethylaminoethoxy)-propyl isobornyl thioether
2-(2-dimethylaminoethoxy)-propyl isobornyl thioether
2-(2-diethylaminoethoxy)-propyl isobornyl thioether
2-(2-dimethylaminoethoxy)-ethoxyethyl isobornyl thioether
2-(2-diethylaminoethoxy)-ethoxyethyl isobornyl thioether
2-dimethylaminoethoxyethyl carvyl thioether
2-diethylaminoethoxyethyl carvyl thioether 2-dimethylaminoethoxyethyl 3-pinanyl thioether
2-diethylaminoethoxyethyl 3-pinanyl thioether
2-dimethylaminoethoxyethyl linalyl thioether
2-diethylaminoethoxyethyl linalyl thioether
2-dimethylaminoethyl abietyl thioether
2-diethylaminoethyl abietyl thioether
2-dimethylaminoethyl caryophyllyl thioether
2-diethylaminoethyl caryophyllyl thioether.

Examples of specific compounds falling within the scope of the insect repellent compound of Formula I of this invention where Y is non-terpenoid include, for example:

2-dimethylaminoethyl 1-octyl thioether
2-dimethylaminoethyl t-dodecyl thioether
2-dimethylaminoethyl phenyl thioether
2-dimethylaminoethyl cyclohexyl thioether
2-dimethylaminoethyl o-chlorophenyl thioether
2-dimethylaminoethyl α-naphthyl thioether
2-dimethylaminoethyl 1-octyl ether
2-dimethylaminoethyl t-dodecyl ether
2-dimethylaminoethyl phenyl ether
2-dimethylaminoethyl cyclohexyl ether
2-dimethylaminoethyl α-naphthyl ether
2-dimethylaminoethylthioethyl 1-octyl ether
2-dimethylaminoethylthioethyl 1-octyl thioether
2-dimethylaminoethylthioethyl t-dodecyl ether
2-dimethylaminoethylthioethyl t-dodecyl thioether
2-dimethylaminoethylthioethyl phenyl ether
2-dimethylaminoethylthioethyl phenyl thioether
2-dimethylaminoethylthioethyl cyclohexyl ether
2-dimethylaminoethylthioethyl cyclohexyl thioether
2-dimethylaminoethylthioethyl α-naphthyl ether
2-dimethylaminoethylthioethyl α-naphthyl thioether
2-dimethylaminoethoxyethyl 1-octyl thioether
2-dimethylaminoethoxyethyl t-dodecyl thioether
2-dimethylaminoethoxyethyl phenyl thioether
2-dimethylaminoethoxyethyl cyclohexyl thioether
2-dimethylaminoethoxyethyl α-naphthyl thioether
2-diethylaminoethoxyethyl cyclohexyl thioether
2-diethylaminoethoxyethyl phenyl thioether
2-diethylaminoethoxyethyl t-dodecyl thioether
2-diethylaminoethoxyethyl 1-octyl thioether
2-diethylaminoethoxyethyl α-naphthyl thioether
2-diethylaminoethoxyethyl α-naphthyl ether
2-diethylaminoethoxyethyl cyclohexyl ether
2-diethylaminoethoxyethyl phenyl ether
2-diethylaminoethoxyethyl t-dodecyl ether
2-diethylaminoethoxyethyl 1-octyl ether
2-diethylaminoethyl α-naphthyl thioether
2-diethylaminoethyl o-chlorophenyl thioether
2-diethylaminoethyl cyclohexyl thioether
2-diethylaminoethyl phenyl thioether
2-diethylaminoethyl t-dodecyl thioether
2-diethylaminoethyl 1-octyl thioether
2-diethylaminoethyl 5,5-dimethyl-3-methylene-1-hexyl thioether
2-dimethylaminoethyl 5,5-dimethyl-3-methylene-1-hexyl thioether
2-dimethylaminoethyl 3,7-dimethyl-1-octyl thioether
2-dimethylaminoethyl p-chlorophenyl thioether
2-diethylaminoethyl p-chlorophenyl thioether
2-diethylaminoethyl 3,7-dimethyl-1-octyl thioether
2-dimethylaminoethyl oleyl thioether
2-diethylaminoethyl oleyl thioether
2-dimethylaminoethoxyethyl oleyl ether
2-diethylaminoethoxyethyl oleyl ether
2-dimethylaminoethylthioethyl oleyl ether
2-diethylaminoethylethioethyl oleyl ether
2-dimethylaminoethoxyethyl oleyl thioether
2-diethylaminoethoxyethyl oleyl thioether.

The following examples are intended to illustrate the invention but not to limit the scope thereof, parts and percentages being by weight unless otherwise specified.

EXAMPLE 1

Ten separate acetone solutions were prepared, each containing 10 weight percent of one of the following compounds:

2-diethylaminoethyl verbenyl ether
2-diethylaminoethoxyethyl α-terpinyl ether
2-diethylaminoethyl t-dodecyl ether
2-diethylaminoethyl α-naphthyl ether
2-diethylaminoethyl 2-caren-4-yl-methyl ether
2-diethylaminoethyl dicyclopentenyl ether
2-diethylaminoethoxyethyl n-octyl ether
2-diethylaminoethyl pinocarvyl ether
   ether
2-dimethylaminoethyl pinocarvyl ether
2-diethylaminoethyl geranyl ether.

Twenty webs consisting of fifty pound brown Kraft paper were prepared for testing. Each solution was used to treat two webs. The test webs were treated with an amount of solution to obtain a concentration of 50 mg. of the compound per square foot of web.

The test arena was a two-inch by five-inch diameter plastic cylinder for cockroaches and a three inch diameter cylinder for confused flour beetles.

The test solutions were applied to the paper webs, allowed to dry overnight and cut into six inch by twelve inch lengths for test purposes. The long edge of a treated and an untreated paper web were joined with transparent tape.

Test cylinders were placed over the treated-untreated paper webs so that the joint made up the diameter of the cylinder. Ten insects of a species were confined to one test cylinder. The walls of the cylinders were greased with mineral oil to force the cockroaches on the paper web surface.

The number of insects on the treated and untreated surfaces was recorded at one hour intervals.

All the treated webs exhibited cockroach repellency of between 95 and 100%. All the webs repelled confused flour beetles, the repellency being, between 90 and 100%.

EXAMPLE 2

When procedure of Example 1 is repeated except the webs are treated with the corresponding dimethylaminoethyl ethers of the insect repellent diethylaminoethyl ethers used in Example 1. The repellency exhibited will be substantially the same as that recorded in Example 1 for the corresponding diethylaminoethyl ethers.

EXAMPLE 3

When procedure of Example 1 is repeated except the webs are treated with the corresponding thioethers of the insect repellent ether compounds of Examples 1 and 2 for the corresponding ethers.

EXAMPLE 4

The procedure of Example 1 was repeated except that the three following compounds were used to treat the webs in place of the ten compounds used in Example 1; 2-diethylaminoethyl 1-octadecyl ether; 4-(2-diethylaminoethoxy) 1-butyl α-terpinyl ether; and 3-(2-diethylaminoethoxy) 1-propyl isobornyl ether. The webs treated with these compounds exhibited a repellency of between 95 and 100%.

EXAMPLE 5

When procedure of Example 4 is repeated except the webs are treated with the corresponding dimethylaminoethyl ethers of the insect repellent diethylaminoethyl ethers used to treat the webs of Example 4. The repellency exhibited will be substantially the same as that recorded in Example 4 for the corresponding diethylaminoethyl ethers.

EXAMPLE 6

When procedure of Example 4 is repeated except the webs are treated with the corresponding thioethers of the insect repellent compounds of Examples 4 and 5. The repellency exhibited will be substantially the same as or slightly greater than that recorded in Examples 4 and 5 for the corresponding ethers.

EXAMPLE 7

Thirty-eight webs of cotton fibers were woven to form small stockings. Nineteen acetone solutions containing 10 weight percent of the following compounds were prepared:

2-diethylaminoethyl myrtenyl ether,
2-diethylaminoethyl bornyl ether,
2-diethylaminoethyl caranyl ether,
2-diethylaminoethyl isobornyl ether,
2-diethylaminoethyl camphanyl ether,
2-diethylaminoethyl fenchyl ether,
2-diethylaminoethyl pinocarvyl ether,
2-diethylaminoethyl geranyl ether,
2-diethylaminoethyl nopyl ether,
2-diethylaminoethyl thujyl ether,
2-diethylaminoethyl sabinyl ether,
2-diethylaminoethyl pinocamphanyl ether,
2-diethylaminoethyl isofenchyl ether,
2-diethylaminoethyl bupleuryl ether,
2-diethylaminoethyl citronellyl ether,
2-diethylaminoethyl mercenyl ether,
2-diethylaminoethyl neryl ether,
2-diethylaminoethyl linalyl ether.

Methadelphene was applied in the same concentration as the sample for standard control comparison.

The repellency tests used mosquitoes and stable flies as test insects. The test cage was a 20" x 20" x 20", 20 mesh screen cage with a sleeve opening. Each solution was used to treat two webs. One square foot sections of the narrow portions of the cotton stockings were impregnated with an amount of acetone solution to obtain 3.3 g. of the compound per square foot of web.

Nineteen cotton fiber stockings so prepared were tested for repellency of mosquitoes and nineteen cotton fiber stockings so prepared were tested for repellency of stable flies. The stockings were allowed to dry in a tray before suspending for ageing.

The following day an untreated nylon stocking was drawn over the arm, and the treated cotton stocking drawn over the nylon about midway up the forearm. The hand was protected by a cotton glove, and the arm exposed for one minute in a cage of the test insects. If less than five bites were received in one minute, the stockings were aged and retested daily up to 10 days or until five bites were received in a single one minute exposure.

All the cotton fiber stockings except the one impregnated with 2-diethylaminoethyl geranyl ether, exhibited repellency to both mosquitoes and stable flies equal to the standard methadelphene (i.e. twelve days protection from mosquitoes and 13 days' protection from stable flies). The cotton fiber stocking impregnated with 2-diethylaminoethyl geranyl ether gave slightly less protection from mosquitoes, but exhibited excellent protection from stable flies (i.e. 23 days' protection for the cotton fiber stocking impregnated with methadelphene to 90 days' protection for the cotton fiber stocking impregnated with 2-diethylaminoethyl geranyl ether).

EXAMPLE 8

When procedure of Example 7 is repeated except the webs are impregnated with the corresponding dimethylaminoethyl ethers of the insect repellent diethylaminoethyl ethers used to impregnate the webs of Example 7, the repellency exhibited will be substantially the same as that recorded in Example 7 for the corresponding diethylaminoethyl ethers.

EXAMPLE 9

When procedure of Example 7 is repeated except the webs are impregnated with the corresponding thioethers of the insect repellent ethers of Examples 7 and 8, the repellency exhibited will be substantially the same as or slightly greater than that recorded in Examples 7 and 8 for the corresponding ethers.

EXAMPLE 10

The procedure of Example 1 was repeated using webs prepared as in Example 1 which exhibited cockroach repellency. These webs were aged for one month and tested for repellency. The webs exhibited cockroach repellency as good as or better than the standard cockroach repellent tested, and showed no lost of repellent activity with age. The webs treated with 2-diethylaminoethyl n-octyl ether, 2-diethylaminoethyl 2-caren-4-ylmethanyl ether and 2-diethylaminoethyl α-terpinyl ether exhibited cockroach repellency better than the standard cockroach repellent.

EXAMPLE 11

The procedure of Example 10 was repeated using the webs of Example 1 which exhibited confused flour beetle repellency. These aged webs exhibited repellency to confused flour beetles as good as or better than the standard confused flour beetle repellent. The results of the confused flour beetle repellency test after 2 weeks being substantially the same as that recorded in Example 1.

EXAMPLE 12

When the webs of Example 2 are aged for 2 weeks and tested for repellency of cockroaches and confused flour beetles, the repellency exhibited by the dimethylaminoethyl ethers will be substantially the same as that recorded in Examples 10 and 11 for the corresponding diethylaminoethyl ethers.

EXAMPLE 13

When the webs of Example 3 are aged for 2 weeks and tested for repellency to cockroaches and confused flour beetles, the repellency exhibited by the thioethers will be the same as or slightly greater than that recorded in Examples 10 and 11 and 12 for those ethers.

What is claimed is:

1. An article comprising a web containing an insect repellent quantity of a compound of the formula:

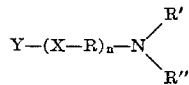

where
Y is selected from the group consisting of acyclic, monocyclic or bicyclic terpenyl and sesquiterpenyl;
X is sulfur or oxygen;
R is lower alkylene;
R' and R" are like or dissimilar lower alkyl; and
$n$ is an integer from 1 to 3.

2. The article of claim 1 where at least one surface of the web is coated with said compound.

3. The article of claim 1 where said compound is incorporated in the body of said web.

4. The article of claim 1 where the web is cellulosic.

5. The article of claim 1 where the web is a continuous film.

6. The article of claim 1 where the web is a pressed mat of non-oriented fibers.

7. The article of claim 1 where, in said formula, R' and R" are like lower alkyl, having from 1 to 4 carbon atoms in the alkyl group.

8. An article of claim 1 where Y is 4-(2-diethylaminoethoxy) 1-butyl α-terpinyl ether.

9. An article comprising a web containing an insect repellent quantity of a compound of the formula:

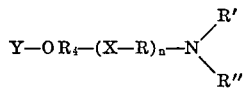

where
Y is selected from the group consisting of acyclic, monocyclic or bicyclic terpenyl and sesquiterpenyl;
X is sulfur or oxygen;
R' and R" are like or dissimilar lower alkyls;
R and $R_4$ are like or dissimilar lower alkylene; and
n is an integer of from 1 to 2.

References Cited
UNITED STATES PATENTS

| | | | |
|---|---|---|---|
| 1,005,180 | 10/1911 | Ellis | 424—27 |
| 3,295,246 | 1/1967 | Landsman et al. | 43—131 |
| 3,003,911 | 10/1961 | Lindstrom et al. | 162—100 |
| 3,397,053 | 8/1968 | Bordenca et al. | 71—98 |

SHEP K. ROSE, Primary Examiner

U.S. Cl. X.R.

47—31, 34.11; 2—22, 4, 171.2; 99—171, 181; 117—138.5; 206—10; 43—131; 5—362; 45—15